Figure 1:
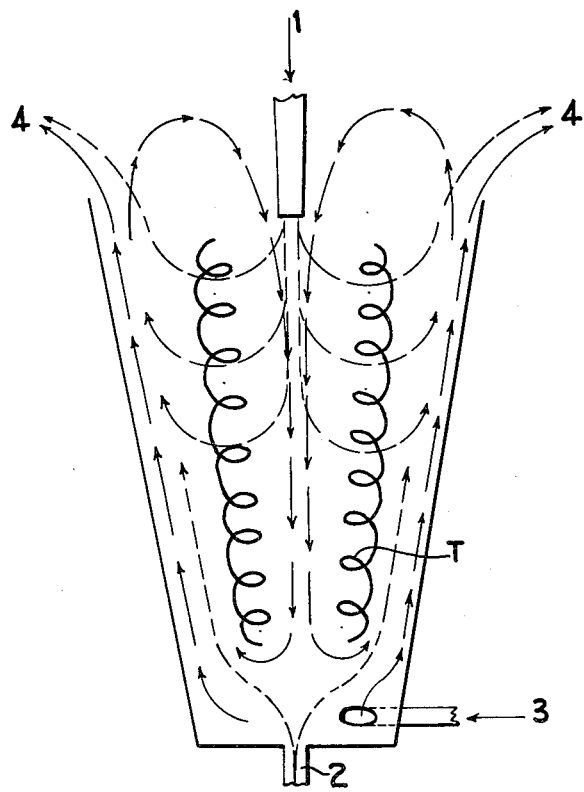
Figure 2:
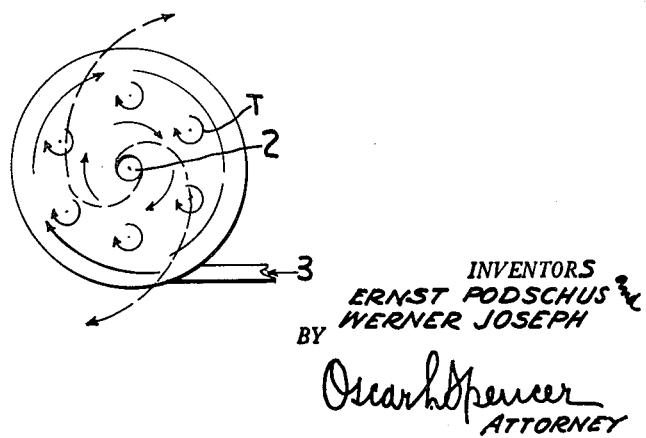

3,021,195
TREATMENT OF SILICATES
Ernst Podschus, Leverkusen-Bayerwerk, and Werner Joseph, Leverkusen, Germany, assignors to Farbenfabriken Bayer Aktiengesellschaft, Leverkusen, Germany, a corporation of Germany
Filed Dec. 30, 1958, Ser. No. 783,658
Claims priority, application Germany Jan. 2, 1958
11 Claims. (Cl. 23—110)

This invention relates to the removal of bound water or water of hydration from solid, essentially water insoluble natural pulverulent silicates such as clay, bentonite, talcum and like aluminosilicates.

The above materials are used for many purposes, such as pigments or fillers for paper, rubber or plastic compositions, as ion exchangers, as catalysts or catalyst supports, and the like. Removal of some or all of the bound water frequently is advantageous.

According to this invention, bound water may be effectively removed from the above mentioned siliceous materials by introducing the material in pulverulent state into a highly turbulent upwardly rising stream of hot gas.

This may be conducted by establishing a circularly flowing or whirling upwardly rising stream of gas in the form of a vortex, the siliceous material being introduced into the central area of this vortex. The average residence time of the siliceous material undergoing treatment in the vortex or the like is only a matter of a few seconds (usually less than 5 seconds, rarely more than one or two seconds, and frequently less than this period). The material is heated to the dehydrating temperature (above 300° C.) within this period and usually the temperature of the material falls below 300° C., or the material is at least separated immediately after heating from the suspension in the gas within at most some seconds, mostly within fraction of a second only depending on the length of the pipe between the heating chamber and cyclone.

Thus, the sintering, decrease in dispersibility or like deteriorations which accrue in normal calcination processes may be avoided by introducing the finely divided fillers of silicic acid or silicate into a current of hot gases so highly turbulent that the particles attain the desired temperature of approximately 500 to 1200° C. at a stay in the calcining zone of the order of one second or less. The intrinsically poor thermal conductivity of silicic acid or silicates is no longer of any significance in the fine division to give grape or spronge shaped aggregates having a size of a few microns. In contrast to hitherto conventional heating in more or less dense layers, the particles cannot agglomerate by sintering on account of their small size and brief stay. There are thus obtained loose silicic acid fillers or silicate fillers which have lost some or the whole of the hydrate water.

For generating the high turbulence required for the brief calcining process, the hot gases, preferably in the form of combustion gases, are introduced with a twist or turning movement and at great speed from a preliminary combustion chamber into the axially symmetrical reaction chamber into which the finely divided fillers to be calcined are continuously fed in a finely divided form. In a preferred mode of operation, the fillers to be calcined are axially introduced at 1 or 2 as illustrated in the drawing in a finely divided form, e.g., either dry with the aid of an injector or as a suspension with the aid of an atomizer, into the occurring back current in the conical reaction chamber, such as illustrated in the accompanying drawing and in our copending application Serial No. 781,253, filed December 18, 1958, entitled "Process for Drying Fillers of Silicic Acid or Silicate."

The hot gases enter the conical reaction chamber through line 3 as shown in FIG. 1 of the drawing at the end of the smallest diameter with a turning movement or twist at an average velocity of 15 meters per second, preferably 50 to 150 meters per second, and at a temperature of 600 to 1200° C., and leave the chamber together with the calcined filler at the end having the largest diameter as indicated by the arrows at 4. The separation from the gas current is effected in conventional manner, for example, in cyclones or other known devices.

The herein contemplated process yields useful results in the heating of sheet lattice silicates, especially clay minerals in very fine division, to temperatures between 500 and 1200° C., preferably 700 to 900° C., for an extremely brief period. The calcining products thus obtained are essentially more loose than the uncalcined starting materials. This loosening becomes apparent in an increase of the bulk volume and settling volume in non-polar liquids. The oil absorption values of sheet lattice silicates increase, however, by calcination much more strongly. Moreover, the specific surface is increased to a multiple. By the previously conventional heating method in muffle or revolving furnaces, there is no marked loosening to be ovserved as against the starting material.

Technically, especially important representatives of clay minerals are kaolins and bentonites. Kaolin is, because of its fine division and its ample occurrence, the filler chiefly used at present, especially in the rubber and paper industries. Because of its relatively large specific surface when compared with other minerals, kaolin is also used as carrier material for insecticides.

It is known that kaolin and bentonite lose their constitutional water upon heating. Kaolin is thereby transformed (between 400 and 800° C.) into the X-ray amorphous metakaolin. The aluminum oxide becomes acid soluble at the same time. Use has been made therefrom in the manufacture of aluminum salts from clay. The properties of the metakaolin obtained by calcination, its whiteness, specific surface, and the like, depend, of course, on the starting kaolin. The degree of looseness obtained by short-period calcination in a current of highly turbulent hot gases is therefore dependent on the starting material, its composition, degree of fineness, and the like.

The loosening of layer lattice silicates by the loss of water may theoretically be explained by the easy splitability along the lattice planes. However, a loosening to such an extent as is attained by the extremely rapid heating according to the invention, of the order of 1 second or less, was not to be expected.

The fillers containing silicic acid produced from layer lattice silicates are more suitable than the starting materials in all fields of application in which a fine division, high bulk volume, and a higher absorption capacity are of importance. They impart better mechanical properties to elastomers and an improved whiteness and opacity to paper. In admixture with insecticides, essentially higher active-substance concentrations are obtained. They are extremely suitable as a fluidizing agent for salts having a tendency to agglomerate, and as a grinding auxiliary for tacky and greasy materials. Their properties are very similar to those of synthetically produced fillers, and have the further advantage of having low production costs.

The following examples are given for the purpose of illustrating the invention:

EXAMPLE 1

A high quality elutriated kaolin, such as used in the ceramic industry, composed of 40.5 percent $Al_2O_3$, 45.9 percent $SiO_2$, and 13.2 percent $H_2O$, corresponding to a molecular ratio of $Al_2O_3 \cdot 1.93SiO_2 \cdot 1.77H_2O$, and containing less than 0.4 percent of $Fe_2O_3$ and a specific surface of 3.9 square meters per gram, is forced in dust form via a shaking chute and an injector with 10 to 20 normal cubic meters per hour of air (5 atmospheres) axially into the upper end of the downwardly tapering conical heating chamber having a capacity of 15 cubic decimeters at a throughput of 40 kilograms per hour.

The temperature in the heating chamber is generated by combustion of lighting gas having a calorific value of about 4000 kilogram calories per cubic meter with the admixture of air in a combustion chamber from where the combustion gases enter tangentially the heating chamber at a speed of 70 meters per second at the lower end thereof and form a vortex or rising, whirling stream of the hot combustion gases. The temperature applied in Experiment 3 is obtained, for example, by combustion of 15 normal cubic meters per hour of air. The more elevated temperatures are obtained by the addition of lighting gas to the combustion gases still containing oxygen, at the lower end of the heating chamber close to the axis.

The kaolin particles, finely divided in the injector air, leave tangentially at the upper end of the heating chamber after a stay of about one second and are deposited in a cyclone where they are precipitated within an average time of only a few (less than 5) seconds from the time when they were introduced into the heating chamber. The precipitated silica cooled below 300° C. within a short time less than 30 minutes, usually within only a minute or two.

The results of the investigation of the kaolin treated according to the process described together with the control samples heated at the same temperature for five hours in a quartz basin placed in an electric muffle furnace provided with a thermostat are illustrated in the following table:

*Table*
ANALYSIS OF THE SAMPLES HEATED ACCORDING TO THE INVENTION AND OF THOSE HEATED IN THE MUFFLE FURNACE

| No. of Exp. | Heating Temperature, ° C., Mode of Heating | Spec. Surf., m.²/g. | Settling Vol., cm.³ | Bulk density, g./l. | Knock density, g./l. | Oil adsorption, g./linseed oil/g. | Water content in percentages | Solubility of the Al₂O₃ content in 20% H₂SO₄ |
|---|---|---|---|---|---|---|---|---|
| 1 | kaolin untreated | 3.9 | 10 | 367 | 685 | 0.36 | 12.4 | 0 |
| 2 | 600° C. process described | 10.3 | 12 | 253 | 475 | 0.61 | 7.72 | 63 |
| 2a | 600° C. in electric muffle furnace | 7.0 | 6 | 387 | 663 | 0.54 | 5.04 | 77 |
| 3 | 700° C. process described | 18.3 | 17 | 204 | 351 | 0.97 | 2.29 | 95 |
| 3a | 700° C. in electric muffle furnace | 5.7 | 7 | 393 | 648 | 0.57 | 1.40 | 98 |
| 4 | 800° C. process described | 21.7 | 17 | 200 | 326 | 1.11 | 1.14 | 99 |
| 4a | 800° C. in electric muffle furnace | 7.7 | 7 | 379 | 616 | 0.67 | 0.35 | 99 |
| 5 | 900° C. process described | 16.6 | 15 | 242 | 410 | 0.85 | 0.81 | 89 |
| 5a | 900° C. in electric muffle furnace | 8.1 | 7 | 361 | 597 | 0.64 | 0.34 | |

The results show that the kaolin treated according to the invention is appreciably more loose and voluminous. Bulk and knock volume, oil adsorption, and settling volume (in toluene) are essentially higher than the products calcined in the muffle furnace and surprisingly superior to the untreated starting sample. Especially remarkable is the increase to more than five-fold of the specific surface of the kaolin treated at 800° C. and the improvement to about three-fold of the oil absorption, as against the starting product.

The new process is also very useful for further processing of the kaolin to give aluminum salts. $Al_2O_3$ and $SiO_2$ of the calcined product are particularly reactive so that the treatment with acid more rapidly leads to the Al salts than according to the previous calcination process. The silica acid residue, which can be separated relatively easily, is especially finely divided and loose, and may serve as a filler, for example.

EXAMPLE 2

25 kilograms of commercial finely ground bentonite of the compositions 53.24% of $SiO_2$
22.44% of $Al_2O_3$
4.94% of $Fe_2O_3$
2.00% of CaO
2.56% of MgO
2.92% of $Na_2O$
0.80% of $P_2O_5$
10.98% of $H_2O$ are forced in dust form, as described in Example 1, by means of a compressed air injector axially into the upper end of a conical heating chamber directly into the return current of the 780–800° C. hot combustion gases. The hot gases are produced by combustion of 17 normal cubic meters per hour of lighting gas and 130 normal cubic meters per hour of air, preheated to about 300° C., in a combustion chamber arranged before the heating chamber. From the combustion chamber, the hot gases enter tangentially the lower end of the reaction chamber. The finely divided bentonite particles leave the heating chamber at the upper end thereof after a stay of 0.1–0.2 second depending on the flow velocity and the temperature of the hot gases as well as the volume of the reaction chamber, and are deposited in a cyclone. The combustion air is heated up in a heat exchanger by the hot waste gases, the calcination product being thereby simultaneously cooled so that it is obtained in the cyclone at about 300° C. As may be seen from the following results of the investigation, the bentonite is rendered appreciably more loose by the short time heating process in accordance with the invention as compared with the untreated starting product.

| Material | Heating temp., ° C. | spec. surf., m.²/g. | Sediment Vol., cm.³ | bulk/ knock density, g./l. | oil adsorption, g./linseed oil/g. |
|---|---|---|---|---|---|
| Bentonite untreated | | 86 | 4 | 665/902 | 0.30 |
| Bentonite heated by the herein described process | 780–800 | 17 | 15 | 220/355 | 1.04 |

In contrast to the kaolin used in Example 1, however, the specific surface of bentonite is essentially reduced by the short time heating process. This is obviously due to the different structure of the montmorillonite, i.e. the chief constituent of bentonite. The interspace between the lattice planes of the bentonite having a high swelling capacity is accessible only to the nitrogen molecule (BET method for the determination of the specific surface); this explains the high value of the specific surface of the uncalcined material. After heating for a short time according to the invention the surface of the product wettable by oil has increased to more than the threefold, whereas the surface accessible to $N_2$ has decreased.

EXAMPLE 3

Besides kaolin, talcum is used to a large extent as a filler as well as a carrier for insecticides. Like kaolin, however, the application of talcum as a carrier for insecticides has hitherto been restricted to dust preparations containing an active substance at a low proportion. 2 kilograms each of talcum of the following composition 50% of $SiO_2$
30.5% of MgO
10.2% of $Al_2O_3$
0.5% of $Fe_2O_3$
0.6% of CaO
0.2% of $K_2O$
0.1% of $Na_2O$
6.3% loss by calcination of a specific surface of 3.6 square meters per gram and a low absorption value of 0.38 gram of linseed oil per gram were passed through in the manner described in the preceding examples for 5 minutes at constant feed rate. Control samples were simultaneously calcined at the same temperatures in a 5 cm. thick layer in quartz basins placed in an electric muffle furnace for 2 hours. The conditions and results of the experiments are shown in the following table.

| No. of Exp. | | Heating temp. | Spec. surf., m.²/g. | Sediment vol. cm.³ | bulk/knock density, g./l. | oil adsorption, g./linseed oil/g. |
|---|---|---|---|---|---|---|
| | starting material. | -------- | 3.6 | 5.0 | 430/808 | 0.38 |
| 1_____ | calcined in the electr. muffle furnace. | 600 | 4.2 | 6.2 | 415/830 | 0.32 |
| 1a____ | process herein described. | 600 | 4.6 | 7.0 | 316/600 | 0.47 |
| 2_____ | muffle furnace___ | 700 | 4.7 | 5.5 | 404/818 | 0.36 |
| 2a____ | process herein described. | 700 | 4.9 | 9.0 | 293/561 | 0.66 |
| 3_____ | muffle furnace___ | 800 | 2.1 | 6.8 | 402/772 | 0.49 |
| 3a____ | process herein described. | 800 | 9.1 | 10.0 | 284/532 | 0.89 |

The results of the experiments show the superiority of the products heated by the herein described process to the untreated control samples calcined in the electric furnace. The difference is especially pronounced in experiment 3a, by which the settling volume, specific surface and oil adsorption is increased to the double as against the starting product. The increase of the oil adsorption by heating according to the invention for an extremely short time allows to use the calcination product as a carrier for insecticidal dust preparations with a high content of active substance.

EXAMPLE 4

A kaolin of the composition given in Example 1 was heated as described in Example 1. Besides the loosening effect indicated in Example 1 and the increase in oil adsorption, the calcination product obtained according to the invention appears to be not only essentially whiter than the control samples calcined in the electric muffle furnace, but even lighter than the starting kaolin.

As may be seen from the attached IBK standard color table with the white point and the standard color value proportions, the kaolin samples treated by the herein described process are decreased in color tint and increased in brightening (in brackets) as compared with the control samples calcined in the muffle furnace and the starting product.

The values given in the attached table were determined by means of the Elrepho device made by the firm Zeiss with standardized color measuring filters. The figures given in the table mean:

1=untreated kaolin
2=heated at 600° C. by the herein described process
3=heated at 700° C. by the herein described process
5=heated at 900° C. by the herein described process
2a=heated at 600° C. in the electric muffle furnace
3a=heated at 700° C. in the electric muffle furnace
5a=heated at 900° C. in the electric muffle furnace The superiority of the whiter and more finely divided product obtained by heating for an extremely short period in paper is demonstrated by the following test:

Bleached sulfite cellulose was ground in aqueous suspension to 42° SR and adjusted to a pH value of 4.6 with 4 percent of aluminum sulfate (referred to dry cellulose). A portion of this batch was kept without the addition of a filler only in admixture with 2 percent of rosin size, further parts were mixed with 10 percent of untreated kaolin and 10 percent of a kaolin heated at 700° C. by the herein described process. From these batches papers weighting 80 g./m.² per sheet were produced by means of an experimental paper machine. The remission values measured with the Elrepho device (made by Zeiss) in an infinitely thick layer as well as the opacity of these papers calculated for a sheet thickness of 0.17 mm. are compiled in the following table.

| | Remission values of the papers at— | | | | opacity corr. 0.17 mm. |
|---|---|---|---|---|---|
| | 420 m$\mu$ | 460 m$\mu$ | 530 m$\mu$ | 620 m$\mu$ | |
| (1) Bleached sulfite cellulose, SR 42°_____ | 68.9 | 76.2 | 85.3 | 89.9 | 0.837 |
| (2) 10% of kaolin untreated__ | 70.9 | 78.2 | 86.4 | 90.9 | 0.874 |
| (3) 10% of kaolin heated by the herein described process_____ | 73.0 | 79.4 | 86.5 | 90.8 | 0.884 |

The figures show that paper No. 3 is distinctly whiter—the remission values in blue are essentially higher, that means the yellowish tint is lower—and shows an increased opacity.

EXAMPLE 5

A high-quality kaolin according to a molecular ratio of $Al_2O_3:SiO_2:H_2O=1.184:2.07$ and containing 0.65% of $Fe_2O_3$ and having a specific surface of 28 m.²/g., is forced in dust form via a metering device by means of an injector axially into the upper end of the conical heating chamber having a capacity of 30 liters of an apparatus described in Example 1 at a rate of 50 kilograms per hour at 680° C. and 730° C. respectively. The quantities of air and gas required for producing the desired temperatures in the heating chambers as well as the results of the investigation of the example treated in accordance with the invention and the control samples calcined in the electric furnace are illustrated in the following table.

| | temp., °C. | gas, Nm.³/h. | air, Nm.³/h. | injector-air, Nm.³/h. | spec. surf., m.²/g. | sediment vol., cm.³ | bulk knock density, g./l. | oil adsorption, g./linseed oil/g. |
|---|---|---|---|---|---|---|---|---|
| starting material_____ | ---- | ---- | ---- | ---- | 28 | 11 | 404/586 | 0.40 |
| heated in the electric furnace_____ | 680 | ---- | ---- | ---- | 24 | 10 | 411/573 | 0.53 |
| process herein described___ | 680 | 21 | 260 | 18 | 28 | 26 | 182/292 | 0.61 |
| heated in the electric furnace_____ | 730 | ---- | ---- | ---- | 26 | 8 | 419/582 | 0.52 |
| process herein described___ | 730 | 24 | 270 | 18 | 26 | 23 | 208/330 | 0.62 |

The average length of stay of the kaolin particles in the heating chamber is about 1/10 second. The loosening of the kaolin corresponds to the results obtained with kaolin as described in Example 1, which is shown by the increase of the settling volume as well as of the bulk and knock volume to the twofold. In contrast thereto, however, the specific surface is not increased. The increase in oil adsorption is also lower than in the case of the kaolin treated as described in Example 1.

The increase in specific surface and oil absorption brought about by heating according to the invention is believed to be the larger the smaller the specific surface of the starting kaolin, provided that the kaolin types are of equal purity.

Although the present invention has been described with particular reference to the specific details of certain em-

We claim:
1. A method of treating a water insoluble natural aluminosilicate containing bound water, in a finely divided, pulverulent state, which comprises establishing a vortex of hot inert gas heated to drying temperature, said vortex having an entry end, an outlet end, and a central area in which there is a flow of gas toward the entry end of the vortex, said central area being surrounded by an external area in which there is circular flow of hot gas around said central area and toward the outlet end of the vortex, introducing the aluminosilicate into said central area and thereby suspending the aluminosilicate in the hot gas and producing a suspension having a temperature of 500 to 1200° C., and removing the resulting suspension from the vortex so rapidly that the average retention time of the alumino silicate in the vortex is less than 5 seconds.

2. A method of treating clay containing bound water, in a finely divided, pulverulent state, which comprises establishing a vortex of hot inert gas heated to drying temperature, said vortex having an entry end, an outlet end, and a central area in which there is a flow of gas toward the entry end of the vortex, said central area being surrounded by an external area in which there is circular flow of hot gas around said central area and toward the outlet end of the vortex, introducing the clay into said central area and thereby suspending the clay in the hot gas and producing a suspension having a temperature of 500 to 1200° C., and removing the resulting suspension from the vortex so rapidly that the average retention time of the alumino silicate in the vortex is less than 5 seconds.

3. The process according to claim 2 wherein the average retention time of the pigment in the vortex is less than one second.

4. The process according to claim 2 wherein the vortex is conical, the hot gases enter into the vortex at the smallest diameter thereof, and the suspension is removed from the vortex at the end of the heating zone having the largest diameter thereof.

5. The process according to claim 2 wherein the vortex is conical, the hot gases enter into the vortex at the smallest diameter thereof, and the suspension is removed from the vortex at the end of the heating zone having the largest diameter thereof, and wherein the suspension is removed from the vortex and is cooled below 300° C., within 30 minutes from the time it is introduced into the vortex.

6. The process of claim 1 in which the vortex is established by introducing a stream of hot inert gas into the lower portion of a conical heating zone adjacent the end thereof of smaller diameter, and the gas is fed in a direction tangentially of the zone and at a velocity of at least 15 meters per second.

7. The process of claim 1 wherein the aluminosilicate is removed from the suspension and is extracted with acid to reduce the aluminum content thereof.

8. The process of claim 2 wherein the clay is recovered from the suspension and is extracted with acid to reduce the aluminum content thereof.

9. A method of treating a water insoluble natural alumino silicate which comprises establishing a vortex of hot inert gas heated to drying temperature, said vortex having an entry end and an outlet end for said gas and a central area in which there is flow of gas toward the entry end surrounded by an external area in which there is circular flow of hot gas around the central area and toward the outlet end, introducing the alumino silicate into contact with the hot gas by feeding it into the central area and thereby suspending the alumino silicate in said gas, and removing the resulting suspension from said outlet end.

10. The process of claim 9 wherein the alumino silicate is clay.

11. The process of claim 10 wherein the vortex is established by introducing the hot gas tangentially into the lower end of a downwardly tapering conical reaction zone.

References Cited in the file of this patent
UNITED STATES PATENTS

| | | |
|---|---|---|
| 1,513,622 | Manning | Oct. 28, 1924 |
| 2,187,538 | Butler | Jan. 16, 1940 |
| 2,316,207 | Winter | Apr. 13, 1943 |
| 2,441,613 | Balassa | May 18, 1945 |
| 2,496,203 | Flint | Jan. 31, 1950 |
| 2,543,987 | Ramsey | Mar. 6, 1951 |
| 2,676,892 | McLaughlin | Apr. 27, 1954 |